Jan. 27, 1970    H. NAUD    3,491,950
VARIABLE DESIGN NOZZLE
Filed Sept. 6, 1967    2 Sheets-Sheet 2

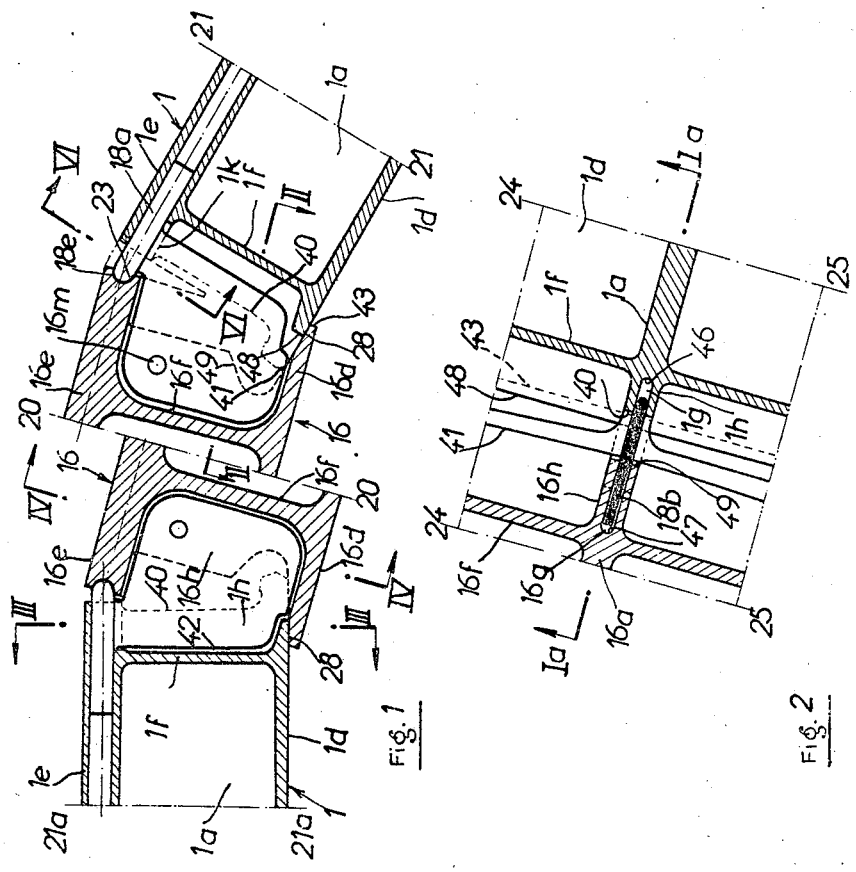

Inventor
Henry Naud
by
Watson, Cole, Grindle & Watson
Attorneys

United States Patent Office 3,491,950
Patented Jan. 27, 1970

3,491,950
VARIABLE DESIGN NOZZLE
Henry Naud, Verrieres-le-Buisson, France, assignor to Société Nationale d'Etude et de Construction de Moteurs d'Aviation, Paris, France, a company of France
Filed Sept. 6, 1967, Ser. No. 665,775
Claims priority, application France, Sept. 7, 1966, 75,567
Int. Cl. B64c 15/06
U.S. Cl. 239—265.39     7 Claims

ABSTRACT OF THE DISCLOSURE

The invention relates to a variable geometry nozzle in which each flap can rotate about an axis of rotation orthogonal to the axis of the nozzle, and the axes of rotation or their geometric extensions together form a regular distortable polygon. Such a nozzle can show tightness defects due to the fact that spaces exist between adjacent flaps. The invention abolishes these tightness defects by means of sealing plates carried by one of the two spindles providing for rotation of each two adjacent flaps and situated in the plane perpendicular to the axis of the nozzle which passes through the axes of rotation.

---

The invention rleates to a variable geometry gas nozzle.

The following designations will be used hereinafter. A plane containing the axis of the nozzle will be termed "diametral." An elongated element whose largest dimension is substantially parallel to the axis of the nozzle will be termed "longitudinal." A linear element or plane perpendicular to the axis of the nozzle and a linear element orthogonal to the axis of the nozzle will be termed "transverse." The direction away from the axis of the nozzle and perpendicular to that axis will be termed "radial." Both the extremity of a linear element, which is symmetrical in relation to a diametral plane, and the surface of the extremity are asymmetrical in relation to the diametral plane and will be termed "lateral."

A variable geometry nozzle of the type to which the invention relates, comprises driving flaps, each of which comprises a substantially transverse web able to pivot about a transverse pivot which can itself be moved in relation to the axis of the nozzle and a flange having a plane of symmetry constituted by a diametral plane, and driven flaps, which alternate with the driving flaps, each of which comprises a substantially transverse web able to pivot about a transverse pivot and a flange having a plane of symmetry constituted by a diametral plane, which latter flange is seated against the flange of each of the two adjacent driving flaps by the pressure of the gases in the nozzle, the successive pivots forming a transverse polygon of which the inscribed circle's centre is situated on the axis of the nozzle.

When such a nozzle is in use, for example in a jet aircraft, a relatively large volume of fluid (ambient air or gas from the propulsive jet) can pass between the web of a driving flap and the web of a driven flap and consequently also between two adjacent flanges, thereby reducing the performance of the nozzle.

In accordance with the invention, the pivot of each flap of one of the two categories of flaps is pierced axially by a bore and a slot is provided in each of the two terminal lateral faces of the web of the flap, each flap of the other category comprises a transverse spindle able to slide in the bore of the pivot of the adjacent flap of the first category, and the web of each flap of said other category ends laterally on either side in a substantially transverse sealing-plate aligned with the spindle and able to slide in the slot of the adjacent flap of the first category.

The sealing prevents leaks between the webs and consequently also between the flanges of two adjacent flaps.

In a preferred embodiment, the terminal spindle of the flap of the other category and the sealing plate, which laterally terminates the web of this flap, together constitute an integral sealing member connected to the remaining part of the flap in the following manner: the sealing plate of the sealing member penetrates into a slot cut into the central part of the web of the flap and is fixed there by a peg; the spindle of the sealing member rests laterally on the pivot of the flap.

Further features and advantages of the invention will emerge from the description of the preferred embodiment, given by way of example only with reference to the accompanying drawings.

In the drawings:

FIGURE 1 shows two transverse sections of a portion of the nozzle, the right-hand section along the line Ia—Ia of FIGURE 2 shows the flaps in the least restricted position of the nozzle, and the left-hand section along the line Ib—Ib of FIGURE 4 shows the flaps in the most restricted position of the nozzle;

FIGURE 2 is a section, parallel to the axis of the nozzle, along the line II—II of FIGURE 1;

FIGURE 3 is a section along the line III—III of FIGURE 1;

FIGURE 5 is a view of the sealing member;

Figure 7:
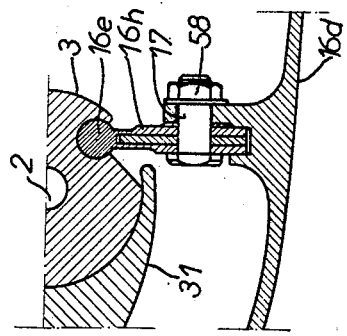
FIGURE 7 is a view, similar to that of FIGURE 4, of a variant embodiment of the nozzle.

In the two embodiments described hereinafter the flaps whose pivot is pierced axially by a bore are the driving flaps.

FIGURE 1 is divided by the line 20—20 into two parts, which correspond to two different extreme areas of aperture of the same nozzle. That part of FIGURE 1 which lies on the left of line 20—20 shows a portion of the nozzle in one of its extreme positions and that part which lies on the right of line 20—20 shows an adjacent portion of the nozzle in its other extreme position. The two reference characters 16 on both sides of line 20—20 denote the two halves, respectively, of one and the same driven flap in its two extreme positions. As will appear from the following and especially from the description of FIG. 4, the passage from one to the other of these two extreme positions takes place through a rotation about an instantaneous axis of rotation (16e) which remains constantly parallel to the plane of FIGURE 1. The consequence is that the two half-sections, lying on the two sides of FIGURE 1, of the driven flap 16 are, except for their positions, two figures symmetrical with respect to line 20—20.

The two reference characters 1 on the two sides of line 20—20 each denote one-half of one of the two driving flaps situated on both sides of the one driven flap 16 shown in its two different extreme positions. The two driving flaps 1 are respectively in their two extreme different positions to which correspond the two extreme different positions shown of the two driven half flaps 16. As will appear from the following and especially from the description of FIGURE 3, the passage from one to the other of the extreme positions of the driving flaps 1 takes place through a rotation about an instantaneous axis of rotation (1a) which remains constantly parallel to the plane of FIGURE 1. The result is that the angle comprised in FIGURE 1 between corresponding parts of the two driving flaps 1 is equal to the angle comprised between their axis of instantaneous rotation. FIGURE 1 shows that this angle is 30°. The polygonal nozzle, a portion of which is shown in the drawing, therefore has 360/30=12 driving flaps and 12 driven flaps. FIGURE 2 shows, in the direction of the axis of the nozzle (longitudinal direction), only a portion of the halves of flaps 1 and 16, the complete halves of flaps extending beyond the line 24—24, 25—25 and the two lines 24—25.

The driving flap 1, one-half of which is shown on the right-hand half of FIGURE 1 and FIGURE 2, comprises a transverse hollow pivot $1e$ and a longitudinal flange $1d$, which has as its plane of symmetry the diametral plane 21—21 and forms part of the wall of the nozzle. The pivot $1e$ and the flange $1d$ are connected by two ribs $1f$, only one of which appears in FIGURE 2 and in the right-hand half of FIGURE 1, because only half of the flip 1 is shown. The pivot $1e$ and the flange $1d$ are likewise connected by a transverse web $1a$, which at the same time constitutes a mask connecting the two ribs $1f$. 40 denotes an edge, at one and the same time lateral and substantially radial, of the web $1a$, and 41 denotes an edge, at one and the same time lateral and longitudinal, of the flange $1d$. The extremities of the pivot $1e$ are notched internally at $1k$ in a transverse plane, i.e. facing the flange $1d$, so as to allow the sliding motion of a sealing member which will be described later. A slot $1g$ is provided in the two terminal faces, at one and the same time lateral and substantially radial, of the parts of the web $1a$ which are outside the ribs $1f$. $1h$ denotes the part in which the slot is provided. 46 is the bottom of the slot $1g$.

The driven flap 16, one half of which is shown in the right-hand half of FIGURE 1 and in FIGURE 2, comprises a solid transverse pivot $16e$, in each extremity of which is a cavity 23 affording a hemispherical seat, and a longitudinal flange $16d$ which has as its plane of symmetry the diametral plane 20—20 and forms part of the wall of the nozzle. The pivot $16e$ and the flange $16d$ are connected by two ribs $16f$, only one of which appears in FIGURE 2 and in the right-hand half of FIGURE 1, because only one half of flap 16 is shown. The pivot $16e$ and the flange $16d$ are likewise connected by a transverse web $16a$, which constitutes at the same time a mask connecting the two ribs $16f$. 49 denotes an edge, at one and the same time lateral and substantially radial, of the web $16a$, and 43 denotes an edge, at one and the same time lateral and substantially radial, of the flange $16d$. A slot $16g$ is provided in the two terminal faces, at one and the same time lateral and substantially radial, of the parts of the web $16a$ which are outside the ribs $16f$. $16h$ denotes the part in which the slot is provided. 47 is the bottom of the slot $16g$. Two holes $16m$ are pierced opposite one another in the part $16h$ of the web $16a$.

Sealing of the space between the webs $1a$ and $16a$ of two adjacent flaps 1 and 16 is effected with the sealing members 18 shown in FIGURE 5, which is composed of a spindle $18a$ and of a sealing plate $18b$ carried by, and parallel to, the spindle $18a$. The sealing member 18 may be diecast.

One extremity $18e$ of the spindle $18a$ of the sealing member 18 has a solid hemispherical shape corresponding to that of the extremity cavity 23 affording the hemispherical seat, of the pivot $16e$. The sealing plate $18b$ is pierced by a hole $18c$. In the mounted state shown in FIGURES 1 and 2 the hemispherical extremity $18e$ is in abutment against the hemispherical cavity 23, the sealing-plate $18b$ penetrates into the slot $16g$ of the driven flap 16, its edge coming almost to the bottom of the slot, the hole $18c$ of the sealing plate $18b$ of the sealing member 18 is opposite the hole $16m$ of the web $16a$ of the driven flap 16 and a peg $18d$ (FIGURE 4), constituted by a rivet, traverses the holes $16m$ and $18c$. The sealing member 18 is therefore rendered rigid with the driven flap 16. Moreover, the spindle $18a$ of the sealing member 18 penetrates into the hollow pivot $1e$ of the driving flap 1 and the sealing plate $18b$ penetrates into the slot $1g$ of the web $1a$ of the driving flap 1. The sealing member 18 thus constitutes a liaison between the driving flap 1 and the driven flap 16.

In FIGURE 3, 27 is a fixed shoe associated with the driving flap 1. It has a cylinrrical inner surface 32 which is a surface of revolution relative to a fixed spindle 30 and in which detent grooves have contingently been provided and which carries two lateral cheeks (not shown) between which the cam 29 rotates about the spindle 30 in contact with the surface 32. The cam 29 defines a cylindrical housing 26 intended to receive the hollow pivot $1e$ of the driving flap 1. Notches are provided in the extremities of the cam 29 for the mounting of the pivot cheeks of the pivot $1e$. A conventional driving mechanism (not shown) and not forming part of the invention, enables all the cams 29 to be rotated at the same time in an identical manner and consequently all the pivots $1e$ to be shifted simultaneously in an identical manner. At the same time as the driving flap 1 is both guided and supported at its pivot $1e$, it is also acted upon in any conventional manner at another place of its axial length, located either on the right or on the left of that part of the length of the flap which is shown in FIG. 1, so that it occupies a controlled position about its pivot $1e$. For instance, it may be acted upon as disclosed in Naud's patent application Ser. No. 651,305, filed July 5, 1967.

As shown by comparison of FIGURES 1 and 3 and the foregoing explanation, FIGURE 3 is a section through the driving flap 1 along the line III—III of FIGURE 1, the driven flap 16 having been assumed removed, and through the device, not shown in FIGURE 1, which supports and shifts the driving flap 1.

Figure 4:
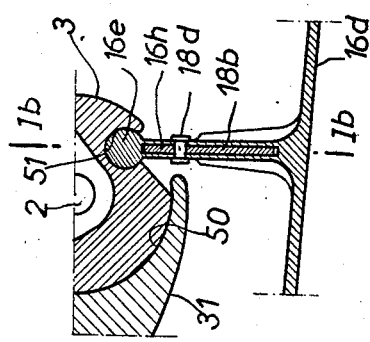
FIGURE 4 is a section along the line IV—IV of FIGURE 1.

In FIGURE 4, 31 is a fixed shoe associated with the driven flap 16. It has a cylindrical inner surface 50 which is a surface of revolution about a fixed spindle 2 and in which detent grooves have contingently been provided, and which carries two lateral cheeks (not shown) between which the cam 3 rotates about the spindle 2 in contact with the surface 50. The cam 3 defines a cylindrical housing 51 intended to receive the solid pivot $16e$ of the driven flap 16. Notches are provided in the extremities of the cam 3 for the mounting of the pivot cheeks of the pivot $16e$.

As shown by comparison of FIGURES 1 and 4 and the foregoing explanation, FIGURE 4 is a section through the driven flap 16 along the line IV—IV of FIGURE 1 and through the device, not shown on FIGURE 1, which supports the driven flap 16.

Figure 6:
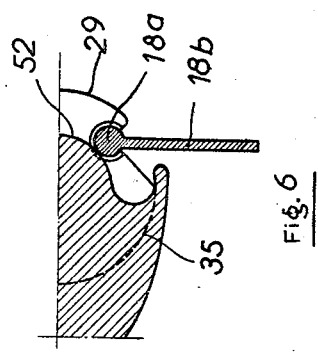
FIGURE 6 is a section along the line VI—VI of FIGURE 1.

The shoes 27 (FIGURE 3) associated with the pivot $1e$ shown in the right-hand half of FIGURE 1 and the cams 29, end in two lateral plane faces parallel to the diametral plane 21—21. Likewise the shoes 31 (FIGURE 4) associated with the pivot $16e$ shown in the right-hand half of FIGURE 1 and the cams 3, end in two lateral plane faces parallel to the diametral plane 20—20. A wedge-shaped gap therefore separates each lateral terminal surface of two elements 27 and 29 (FIGURE 3) from the adjacent lateral terminal surface of two elements 31 and 3 (FIGURE 4). This gap is filled by a body whose transverse cross-section is trapezoidal, which body is delimited laterally by two plane contiguous surfaces applied against the lateral terminal surfaces of the elements 27, 29, 31 and 3. This part is shown at 35 in FIGURE 6. It has a profile 52 such that the spindle $18a$ of the sealing member remains constantly in contact with it in the course of its travel.

When all the cams 29 occupy corresponding positions and when, moreover, a sealing member 18 is interposed between two adjacent flaps, the successive adjacent pivots $1e$ and $16e$ form a transverse polygon of which the inscribed circle's centre is situated on the axis of the nozzle.

The nozzle is mounted as follows; a sealing member 18, the sealing plate $18b$ of which has not yet been perforated at 18c, is mounted at each side of a driven flap 16, the sealing plate 18b sunk into the slot 16g until the spindle 18a comes into contact at 23 with the pivot 16e. The hole 18c is pierced in the sealing plate 18b opposite the holes 16m. The rivet 18d (FIGURE 4) is placed through the holes 16m and the hole 18c. The two sealing members 18 and the driven flap 16 are thus made rigid. The pivot 16e is introduced into the housing 51 (FIGURE 4) of a cam 3. A driving flap 1 is introduced into the housing 26 (FIGURE 3) of one of the two adjacent cams 29 in such a way that the sealing plate 18b of the member 18 penetrates into the slot 1g of the web 1a and the spindle 18a of the member 18 penetrates into the pivot 1e of the flap 1.

A sealing member 18 is mounted in the already mounted driving flap 1, then a driven flap 16, and so on in stages.

To vary the transverse section of the nozzle the cams 29 (FIGURE 3) are made to rotate, in the same way that has already been indicated earlier, which moves the pivots 1e away from or closer to the axis of the nozzle.

During this movement the extremities 18e of the spindles 18a of the sealing members 18 remain in contact with the cavities 23 of the pivots 16e because of the connections afforded by the rivets 18d.

The webs 1a, through the intermediary of the spindle 18a, therefore carry along in this movement the webs 16a of the flaps 16 by causing the cams 3 to rotate in the shoes 31, the transverse polygon mentioned earlier, formed by successive adjacent pivots 1e and 16e, altering in size whilst retaining the same regular polygonal shape. The sealing plates 18b slide in the slot 1g and the spindles 18a slide in the hollow pivots 1e. The pressure of the gases inside the nozzle presses the lateral edges of the flange 16d of the driven flap 16 against the lateral edge of the flange 1d of the driving flap 1. The curvature of the flaps in the transverse planes and in the diametral planes is chosen such that the two flaps 1 and 16 remain in contact at 28 for all the apertures of the nozzle. In the configuration of the nozzle shown in that part of FIGURE 1 which is to the left of the line 20—20, the pivots 1e and 16e are nearer to the axis of the nozzle and the surface of contact 28 between the edges of the flanges 1d and 16d is bigger than in the right-hand part of the figure.

Sealing the interstices of the nozzle is ensured as follows; on the part of the driving flap 1, by the contact of the sealing plate 18b with the walls of the slot 1g and with the edges of the notch 1k; on the part of the driven flap 16, by the permanent contact of the sealing plate 18b with the walls of the slot 16g and with the outer extremity of the pivot 16e; between the fixed shoe 27 and the cam 29, by the contiguous surface 32; between the fixed shoe 31 and the cam 3, by the contiguous surface 50; between, on the one hand, the fixed shoes 27, 31 and the cams 29, 3 and, on the other hand, the trapezoidal bodies 35, by the lateral contiguous surfaces of these various elements, by the cylindrical profiled surfaces 52 of these trapezoidal bodies and by the parts of the spindles 18a of the sealing member 18 which stand out from the pivots 1e; on the lateral edge of the flanges 1d and 16d of the flaps 1 and 16, by the surface of contact 28. Any leakage of the discharge jet or any inlet of air is therefore prevented during operation of the nozzle.

Figure 9:
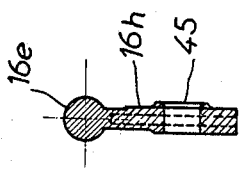
FIGURE 9 is a section along the line IX—IX of FIGURE 8.
Figure 8:
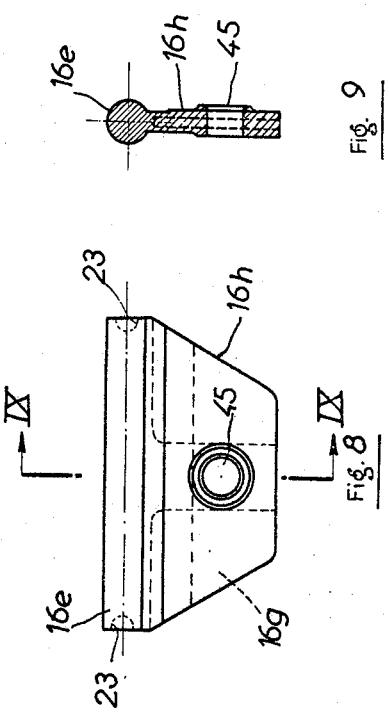
FIGURE 8 is a front view, in this variant, of the web of the driven flaps.

FIGURES 7, 8 and 9 show a variant embodiment. FIGURE 7 shows a transverse section executed in the same circumstances, defined earlier, as FIGURE 4. In this variant, the driven flap 16 is in two parts, the web 16a and the flange 16d, which can rotate one in relation to the other. The axis of rotation is constituted by a longitudinal bolt 17 fixed by a nut 58 passing through a hole 45 in the web 16a. The lateral terminal parts 16h of the web 16a enclose the slots 16g.

With this arrangement the flange 16d of a driven flap 16 pivot about two orthogonal axes, the transverse axis 16e and the longitudinal axis 17, which improves the seal effected at the surface of contact 28 of the flanges 1d and 16d of the two flaps 1 and 16.

I claim:

1. In a variable geometry gas nozzle comprising a plurality of flaps disposed successively adjacent each other in the form of a regular polygon of which the inscribed circle's centre is on the axis of the nozzle, each flap comprising a substantially transverse web, a transverse pivot element about which the transverse web is mounted for rotation, and a flange carried by the transverse web and having a plane of symmetry which is diametral, the transverse pivots of alternate flaps being radially shiftable and the transverse pivots of the other alternate flaps being mounted to follow said radially shiftable transverse pivots, whereby the first mentioned alternate flaps constitute driving flaps and the second mentioned alternate flaps constitute driven flaps, the flanges of said driven flaps overlapping the flanges of the driving flaps for seating thereagainst during operation by the pressure of the gas in the nozzle, the improvement consisting in the provision, for the adjacent lateral edges of each two adjacent flaps, of a bore formed in the pivot element and of a slot formed in the lateral face of the web of one of said two flaps and a transverse spindle and a sealing plate aligned with said spindle carried by and projecting laterally from the second of said two flaps and respectively slidably engaging in said bore and said slot.

2. A variable geometry nozzle according to claim 1 wherein each alternate flap is provided with bores at opposite ends of the pivot element and with slots at opposite lateral faces of its web, each other alternate flap carrying two oppositely directed spindles and two oppositely directed sealing plates.

3. A variable geometry nozzle according to claim 2, wherein the flaps having said oppositely directed spindles and sealing plates are driven flaps.

4. A variable geometry nozzle according to claim 1, wherein the transverse spindle and sealing plate on the second flap are integrally formed as a sealing member, means being provided rigidly to connect the sealing plate of said member to the web of said flap with the spindle resting on the pivot element of said flap.

5. A variable geometry nozzle according to claim 1 including means forming part of each driving flap and mounting the flange of said flap for rotation relative to the web thereof about a longitudinal axis.

6. A variable geometry nozzle according to claim 1 including means forming part of each driven flap and mounting the flange of said flap for rotation relative to the web thereof about a longitudinal axis.

7. A variable geometry nozzle according to claim 1 including, for each flap, a sealing cam defining a housing accommodating the pivot element of the flap, and a body of trapezoidal cross-section located in the space formed between each two successive cams, said body having a part of cylindrical surface profile such that the part of the spindle of the adjacent sealing member, which is outside the hollow pivot element is constantly in contact with the said part of the body during shifting of the pivot.

References Cited

UNITED STATES PATENTS 3,441,221   4/1969   Naud et al. _____ 239—265.39 X

EVERETT W. KIRBY, Primary Examiner

M. Y. MAR, Assistant Examiner